United States Patent [19]

Gruen et al.

[11] 4,142,300

[45] Mar. 6, 1979

[54] LANTHANUM NICKEL ALUMINUM ALLOY

[75] Inventors: Dieter M. Gruen, Downers Grove; Marshall H. Mendelsohn, Westmont; Austin E. Dwight, Downers Grove, all of Ill.

[73] Assignee: The United States of America as represented by the United States Department of Energy, Washington, D.C.

[21] Appl. No.: 816,574

[22] Filed: Jul. 18, 1977

[51] Int. Cl.$^2$ .................. C01B 6/26; C22C 19/03
[52] U.S. Cl. .................. 34/15; 75/134 F; 75/152; 75/170; 423/644
[58] Field of Search .......... 75/170, 134 F, 152; 34/15; 423/644

[56] References Cited

U.S. PATENT DOCUMENTS 3,825,418  7/1974  Reilly et al. ............... 75/170

OTHER PUBLICATIONS

Achard et al., Rare Earth Ternary Hydrides, Hydrogen Storage Applications, Jun. 6-11, 1977, Second International Congress on Hydrogen in Metals, Paris, France.

Primary Examiner—R. Dean
Attorney, Agent, or Firm—Dean E. Carlson; Frank H. Jackson; James W. Weinberger

[57] ABSTRACT

A ternary intermetallic compound capable of reversible sorption of hydrogen having the chemical formula $LaNi_{5-x}Al_x$, where x is in the range of about 0.01 to 1.5 and the method of storing hydrogen using the intermetallic compound.

3 Claims, 1 Drawing Figure

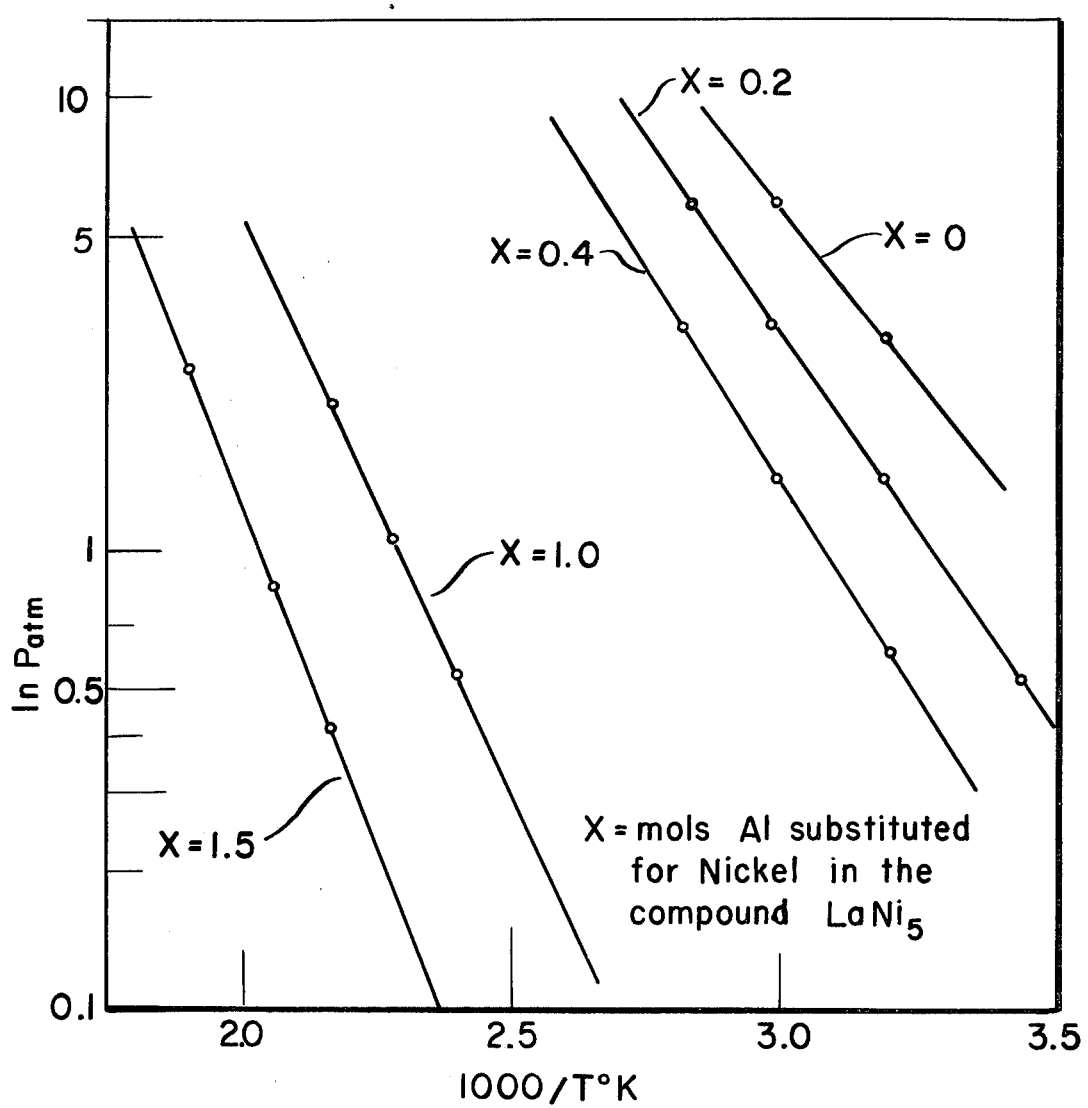

LANTHANUM NICKEL ALUMINUM ALLOY

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

This invention relates to a ternary intermetallic compound capable of reversibly sorbing hydrogen, and to a method of storing hydrogen using the compound. More specifically, this invention relates to a ternary intermetallic compound capable of reversibly sorbing hydrogen, in which the decomposition pressure of the compound as a hydride at a given temperature can be controlled.

The use of hydrogen gas as a working fluid in a closed system to provide for space heating, space cooling and power generation is under active consideration today as means for utilizing low-grade sources of heat to conserve on fossil fuels. One such system is described in U.S. Patent Application No. 773,363, filed Mar. 1, 1977 and assigned to the common assignee. The system described, therein operates as a chemical heat pump by utilizing the ability of metal hydrides to chemically store hydrogen at a relatively low temperature and pressure in a concentrated form and then release the hydrogen at an elevated temperature and pressure. In order for systems such as these to effectively utilize low-grade thermal energy such as waste heat from fossil or nuclear power plants or renewable thermal energy sources such as sunlight, it is imperative that the metal hydrides have sufficient decomposition or desorption pressures at the decomposition temperatures which are attainable from the available sources of thermal energy. Ideally, it should be possible to modify a hydride to decompose at the temperatures available to provide hydrogen gas with sufficient pressure to react with a second hydridable metal to form a second hydride for thermal energy storage.

Binary intermetallic compounds of particular interest for this purpose have the general composition $AB_5$ where A is calcium, lanthanum or a rare earth and B is nickel, cobalt or a 3d transition metal, since these compounds have good hydrogen-desorption kinetics and large hydrogen storage capacity. The binary hydride $LaNi_5H_{6.7}$ in particular has been investigated. However, in many applications, materials are required whose decomposition pressures are different from those of $LaNi_5H_{6.7}$. The desorption pressure of this compound may be modified by substituting either lanthanum or nickel with other elements. It is known that 20% substitution of nickel by a number of transition metals can lower the decomposition pressures by a factor of about 4.

SUMMARY OF THE INVENTION

We have found that, by substituting aluminum for nickel in the compound $LaNi_5$, it is possible to lower the decomposition pressure of the hydride without impairing either the kinetics or the hydrogen capacity of the compound. It has also been found that substituting aluminum for nickel allows a wide range of decomposition pressures to be spanned in continuous fashion so that it is now possible to control the compound composition to obtain any of a range of decomposition pressures over more than two orders of magnitude. This is a significant advance over the present state of the art and is of importance in a number of applications of these materials, e.g. their use as chemical heat pumps as described in the hereinbefore cited patent application.

In accordance with a preferred embodiment of this invention, there is provided a ternary intermetallic compound capable of reversible sorption of hydrogen having the chemical formula $LaNi_{5-x}Al_x$ where x is in the range of about 0.01 to 1.5.

Also provided is a method of storing hydrogen which comprises contacting gaseous hydrogen with a ternary intermetallic compound having the formula $LaNi_{5-x}Al_x$ where x is in the range of about 0.01 to 1.5.

It is thus the principal object of this invention to provide a ternary intermetallic compound which reversibly sorbs hydrogen to form a hydride which can be modified to change the decomposition pressure of the hydride at a given temperature over a range exceeding two orders of magnitude.

BRIEF DESCRIPTION OF THE DRAWING

The FIGURE contains several curves showing the effect of substituting varying amounts of aluminum (in mols) for nickel in the compound $LaNi_5$ on the decomposition pressure at various decomposition temperatures.

DESCRIPTION OF THE PREFERRED EMBODIMENT

A ternary intermetallic compound in accordance with the invention can be prepared by melting together appropriate quantities of high-purity lanthanum, nickel and aluminum, in a furnace, which may be either arc or induction heated, under an inert atmosphere, to form an intermetallic compound which is then cooled. The compound is then homogenized by heating at below melting temperature under a vacuum for a period of time sufficient to provide uniform composition throughout the sample.

The homogenized intermetallic compounds are activated by contacting the compounds with hydrogen gas at a pressure at least above the decomposition pressure of the compound, generally 300–800 psia, for a period of time sufficient to hydride the compounds, generally ½ to 2 hours. It may be preferred to first granulate the material to ¼ to ½" particles to ensure complete activation.

X-ray diffraction patterns taken of the compounds of the invention by the Debye-Scherrer method, with filtered Fe radiation, have shown that the crystal structure is of the $CaCu_5$-type, which is the same as for $LaNi_5$. It has been found that there is a direct correlation between cell size and decomposition pressure and that the effect of substitution in the compound is to enlarge the unit cell and thus is the key to changing the decomposition pressure. It has further been found that aluminum causes a larger cell size increase per mol of substituent than does any other element.

EXAMPLE I

The ternary intermetallic compound $LaNi_{4.6}Al_{0.4}$ was prepared by placing a charge containing the appropriate quantities of 99.9% purity materials into a water-cooled copper crucible. The charge was melted three times at 100 amps with a tungsten electrode under an argon atmosphere. The resulting alloy was then homogenized in an evacuated quartz capsule at 800° C. for one week.

A sample of the compound weighing 4,2332 gm was placed in an all 316 stainless steel reactor, fitted with a 1 μ porous stainless steel filter disc. The sample was then thoroughly degassed at room temperature and 90° C. After cooling to room temperature, 110.8 mmoles of H were added to the reactor at a pressure of 563 psi. Within one hour, the material had been activated, absorbing 32.0 mmoles $H_2$. This corresponds to the composition $LaNi_{4.6}Al_{0.4}H_{6.35}$. After this "activation" procedure, the sample would then rapidly absorb and desorb hydrogen at the appropriate temperature and pressure. The dissociation pressure-temperature for this compound are shown in the FIGURE.

EXAMPLE II

Two large chunks of the compound $LaNi_{4.8}Al_{0.2}$ and weighing a total of 4.6029 gm were placed in a stainless steel reactor equipped with a 1 μ porous stainless steel filter disc. The sample was then thoroughly degassed at room temperature and at 90° C. After cooling, 144.8 mmoles of H were added to the reactor at a pressure of 742 psi. Within one hour, the material had been activated, absorbing 37.2 mmoles of $H_2$. This corresponds to the composition $LaNi_{4.8}Al_{0.2}H_{6.9}$. This compares favorably with the hydrogen content of $LaNi_5H_{6.7}$ and shows that hydrogen storage capacity is not impaired by the addition of aluminum. Furthermore, the rate of the hydriding and dehydriding reactions are not impaired by the aluminum additions. After this "activation" procedure, the sample would then rapidly absorb and desorb hydrogen at the appropriate temperature and pressure. The dissociation pressure-temperature for this compound are shown in the FIGURE.

It was found that not only was it possible to modify the decomposition pressure of the hydride for a given temperature, but that this control of pressure was achieved without any loss of hydrogen-sorbing capacity of the tertiary intermetallic compound.

Thus it can be seen that not only is it possible to lower the decomposition pressure of the compound in a continuous fashion over a range of 2 orders of magnitude at a given temperature by increasing the amounts of aluminum in the compound, but that this is accomplished with little or no effect upon the hydrogen sorption capacity of the intermetallic compound. Furthermore, the kinetics of absorption and desorption are not impaired by the aluminum addition.

The embodiments of the invention in which an exclusive property or privilege is claimed are defined as follows:

1. A ternary intermetallic compound capable of reversible sorption of hydrogen having the chemical formula $LaNi_{5-x}Al_x$ where x is in the range of 0.01 to 1.5.

2. The method of storing hydrogen comprising contacting a ternary intermetallic compound having the formula $LaNi_{5-x}Al_x$ where x is in the range of 0.01 to 1.5 with gaseous hydrogen at a pressure above the dissociation pressure of the hydride.

3. The method of storing hydrogen of claim 2 wherein the gaseous hydrogen is at a pressure of 300 to 800 psia.

* * * * *